(12) United States Patent
Abenaim

(10) Patent No.: US 12,364,579 B2
(45) Date of Patent: Jul. 22, 2025

(54) SCAN BODY WITH HEALING ABUTMENT

(71) Applicant: Jonathan Abenaim, Hawthorne, NJ (US)

(72) Inventor: Jonathan Abenaim, Hawthorne, NJ (US)

( * ) Notice: Subject to any disclaimer, the term of this patent is extended or adjusted under 35 U.S.C. 154(b) by 0 days.

(21) Appl. No.: 17/519,874

(22) Filed: Nov. 5, 2021

(65) Prior Publication Data

US 2023/0141391 A1 May 11, 2023

(51) Int. Cl.
*A61C 8/00* (2006.01)
*A61C 9/00* (2006.01)

(52) U.S. Cl.
CPC .......... *A61C 8/0051* (2013.01); *A61C 8/0001* (2013.01); *A61C 8/008* (2013.01); *A61C 9/0046* (2013.01)

(58) Field of Classification Search
CPC ....... A61C 8/008; A61C 8/005; A61C 8/0051; A61C 8/0001
See application file for complete search history.

(56) References Cited

U.S. PATENT DOCUMENTS

| | | | | |
|---|---|---|---|---|
| 2003/0082498 A1* | 5/2003 | Halldin | ................ | A61C 8/0069 |
| | | | | 433/172 |
| 2004/0121286 A1* | 6/2004 | Aravena | ................ | A61C 8/005 |
| | | | | 433/173 |
| 2009/0317765 A1* | 12/2009 | Dacremont | .......... | A61C 8/0031 |
| | | | | 433/174 |
| 2012/0135371 A1* | 5/2012 | Jahn | ..................... | G03B 21/132 |
| | | | | 433/72 |
| 2017/0224446 A1* | 8/2017 | Daftary | ................ | A61C 8/0068 |
| 2019/0350684 A1* | 11/2019 | Berckmans, III | .. | A61C 13/0019 |
| 2020/0237483 A1* | 7/2020 | Vergoullis | ............ | A61C 8/0016 |
| 2020/0375705 A1* | 12/2020 | Suttin | .................... | A61C 8/008 |
| 2021/0236244 A1* | 8/2021 | Vergoullis | ............ | A61C 8/0053 |

FOREIGN PATENT DOCUMENTS

WO    WO-2021245469 A1 * 12/2021

OTHER PUBLICATIONS

Search Report dated Jan. 16, 2023 issued in European Patent Application No. 22203264.1.

* cited by examiner

*Primary Examiner* — Eric J Rosen
*Assistant Examiner* — Sydney J Pulvidente
(74) *Attorney, Agent, or Firm* — COZEN O'CONNOR

(57) ABSTRACT

A scan body with healing abutment for coupling to an implanted dental component includes: a scannable portion; a healing abutment portion; and a skirt positioned between the scannable portion and the healing abutment portion, the skirt having an upper surface containing scannable indicia. The scannable portion is positioned at an apical end of the healing abutment portion and comprises a tapered body; and the healing abutment portion comprises a lower surface of the skirt and a tapered hollow cuff extending from the lower surface of the skirt toward a distal end.

9 Claims, 17 Drawing Sheets

SCAN BODY WITH HEALING ABUTMENT

BACKGROUND OF THE INVENTION

1. Field of the Invention

This invention relates to healing abutments, temporary prosthetic abutment, and scan body units with coding for intraoral scanning to assist in placement of implant-supported crowns and dentures.

2. Related Art

Coded healing abutments were initially used with conventional impressions and allowed the placement of the definitive crown in fewer appointments and removal of the healing abutment only once, reducing irritation of the peri-implant soft tissues. This technique was later implemented by using intraoral scanners for digital implant scans. The use of these coded abutments with intraoral scans may be advantageous because the scan can be made digitally at the implant placement appointment, during uncovering, or after healing of the soft tissues after uncovering, without direct contact between the impression material and the soft tissues.

FIGS. 1A and 1B illustrate a prior art use of a scan body healing abutment 1. The device has, from top to bottom, a scan body 10 shaped so as to provide information for reading by an intraoral scanner, not shown. The base of the scan body is shaped with a lower vertical indentation 11 insertable into a vertical groove 14 in the healing abutment 12. The healing abutment 12 has an arcuate profile 16 at the point at which it will contact a patient's gum tissue 15. To attach the healing abutment 12 to an implant, or multiunit base, not visible in FIGS. 1A and 1B, a threaded post 18 is screwed and tightened into a receiving portion of the base or implant.

As can be seen in FIG. 1B, when so attached to the implant, the scan body 10 projects above the abutment 12 to permit scanning of the scan body 10, while at the same time the healing abutment presses the gum tissue 15 away from the scan body. Using the scan results, adjustments can be made, such as any needed tightening of the abutment and the like. However, there are often problems with prior art devices in relation to excessive bleeding, insufficient growth of the gum tissue during the healing process, and difficulty in reading the coding on the scan body.

Therefore, an improved scan body with healing abutment is needed that addresses the above-mentioned drawbacks.

SUMMARY OF THE INVENTION

In view of the above problems of the prior art, it is an object of the present invention to reduce bleeding, promote healthy tissue growth, and to ensure that an optical scanner can read all of the scan bodies, even scan bodies that may differ in penetration depth.

In a first aspect of the invention there is provided a device, configured to perform a scan body function, and a healing abutment function that allows a temporary tooth to cement correctly and maintain enough height and retention, that prevents cement from going in sulcus, with the device further customized with a skirt to provide a guide to soft tissue. As a result, the device will maintain site-surrounding tissue away from the site, maintain hemostasis, and allow for same day scanning.

In an illustrated embodiment the device comprises a skirt, a scan body and a hollow cuff.

According to an aspect of the present invention, a scan body with healing abutment for coupling to an implanted dental component is disclosed having a scannable portion, a healing abutment portion, and a skirt positioned between the scannable portion and the healing abutment portion, with the skirt having an upper surface containing indicia, the upper surface of the skirt forming a part of the scannable portion. The scannable portion is positioned at an apical end of the healing abutment portion and has a tapered body. The healing abutment portion includes a lower surface of the skirt and a tapered hollow cuff extending from the lower surface of the skirt toward a distal end.

In another aspect, the scannable portion includes an index portion with a flat surface.

In another aspect, the indicia comprises one or more dots indicative of a length of the healing abutment portion.

In another aspect, the scan body and healing abutment further comprises an internal hollow extending over a portion of the length of the healing abutment portion.

In another aspect, the surface of the skirt is planar and lies perpendicular to a longitudinal axis of the healing abutment portion.

In accordance with another aspect of the invention, a method of creating a dental restoration using the above-mentioned scan body and healing abutment is described. The method involves: scanning the scannable portion and healing abutment portion with an intra-oral scanner or taking an impression of the scannable portion; using information from the scanning or taking the impression to design a dental restoration; and producing the dental restoration so designed.

In another aspect, the healing abutment is configured to be attached to a dental implant or multiunit protrusion, the healing abutment being configured to selectively support a final restoration and having an outer surface that corresponds to a height of soft tissue adjacent the installed dental implant, the height of the soft tissue being limited upwardly by the lower surface of the skirt; and the scannable portion has at least one feature configured to be scanned by an intra-oral scanner or transferred to a physical impression to transfer information regarding the orientation and position of the healing abutment and the dental implant or multiunit protrusion.

In another aspect, the skirt has a beveled lateral edge.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The figures are described as follows:

FIG. 4A is a top view of the scan body and healing abutment according to the present invention showing coding at the upper surface of the skirt in the form of indicia such as holes, protrusions, and the like;

DETAILED DESCRIPTION OF THE PRESENTLY PREFERRED EMBODIMENTS

Figure 1A:
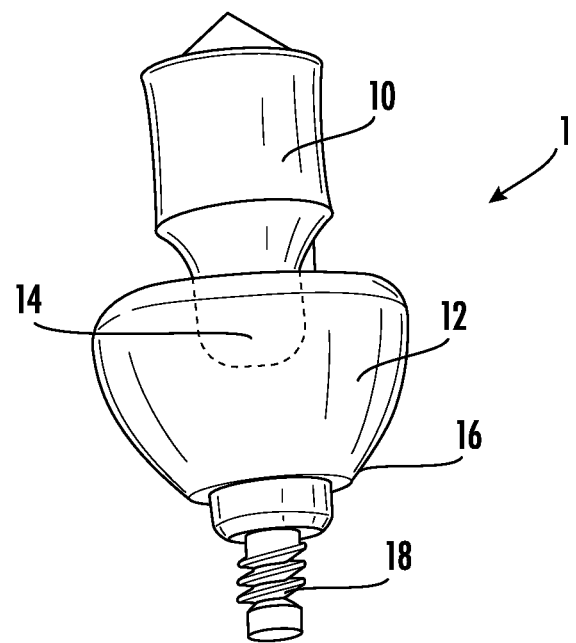
FIGS. 1A and 1B show a scan body and healing abutment according to the prior art.
Figure 1B:
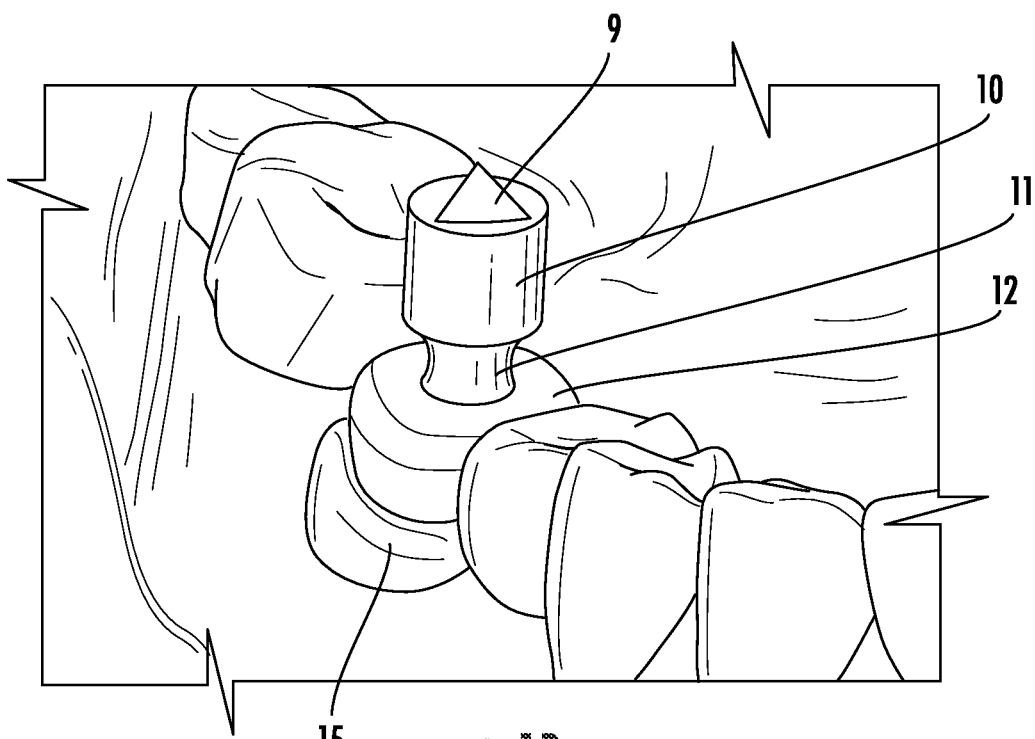
Figure 2:
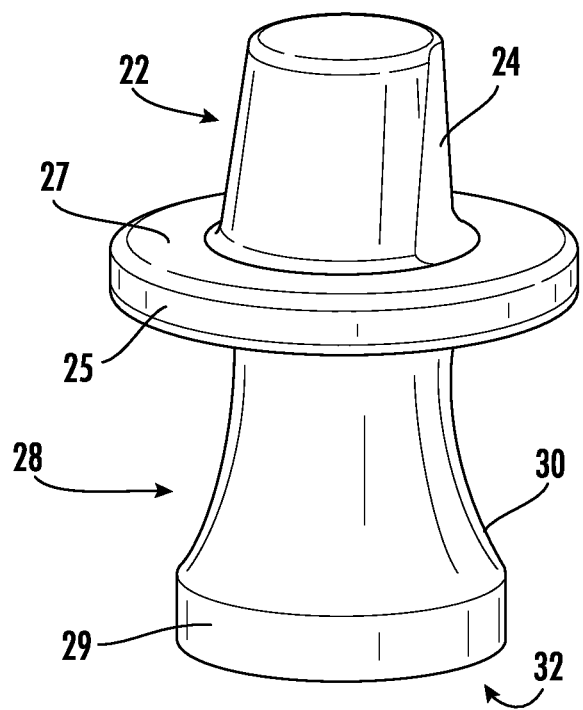
FIG. 2 is an isometric view of the scan body and healing abutment according to the present invention.

FIG. 2 shows an example scan body with healing abutment (e.g., "cap" or "device") 20 in accordance with the present invention. The cap 20 performs both the function of permitting intraoral scanning and the function of a healing abutment.

The scannable portion of the cap 20 consists of a shaped, contoured and matte or sand or bead-blasted, finished scan body 22, and the matte finished and coded top surface 27 of the skirt/platform 25 (hereinafter "skirt"). In use, after installation of the cap, to be discussed further below, only the scan body 22 and the coded top surface 27 will protrude above the gums, and be discernable by an intraoral scanner. It should be note that the peripheral/lateral edges of the skirt 25 can have a partial beveling 24 at the top and bottom of the lateral edges, as shown for example in FIG. 2. Alternatively, the edges may not have a beveling, as seen, for example, at FIGS. 5A to 5F, but can instead substantially form right angles, but preferably with smooth edges, since a sharp edge might cause irritation.

The lower part of the cap 20, which acts as a healing abutment, consists of the under surface of the skirt 25 and the cuff 28. In contrast to the matte finished scannable portion of the cap 20, the metal making up the healing abutment portion of the cap 20, is highly polished to present soft tissue attachment and healing with no irritation to the patient. The above textures provide a multi-zone design.

As discussed below, in a typical use of the cap 20, plural instances of the cap 20 will be affixed to extensions 21 of a multiunit base. According to an advantageous aspect of the invention, the cap 20 is presented in several varieties, having different length cuffs 28. The different lengths of the cuffs allows different overall height caps 20 to be used for different depths of the implant or multiunit base, which, among other things, ensures that the top of each cap will protrude by an amount sufficient to allow for accurate intraoral scanning.

In general all varieties of cap 20 will have the upper portion of the cap 20, which includes the scan body 22, having a contoured indicia 24, and the skirt 25, having the same dimension, in particular the same height. The differences in dimensions between the varieties of caps 20 are limited to the height of the cuff portion 28, which after installation, will not be visible, since the growth of the gums is limited by the lower surface of the skirt 25. To provide information to the scanner regarding the depth of the cuff, coding is provided on the top surface 27 of the skirt 25 that is indicative of the height of the cuff 28 for that particular cap 20.

Each cuff 28, regardless of height, has an arcuate curvature of its wall 30 such that the diameter of the cuff 28 is at its smallest just below the skirt 25, and increases thereafter as one moves down the wall 30. The cuff may terminate at a constant diameter region (29 in FIG. 2) at the distal end thereof. In contrast to the matte finish of the upper portions of the cap, the lower surface of the skirt 25, and the entire outer surface of the cuff 28 are preferably polished to a mirror finish to ensure comfort and cleanliness for the growth of the gums and/or other surrounding tissue.

The longest cuffs 28 will be configured with the portion 29 of either constant or nearly constant diameter (FIG. 2). Also the cuff is hollow at region 32 to permit the cap 20 to fit over a protrusion of a multiunit and to guide at least some of the gum tissue up and into the hollow portion of the cuff 28, to facilitate, i.e., provide clearance for, gum growth.

Figure 3A:
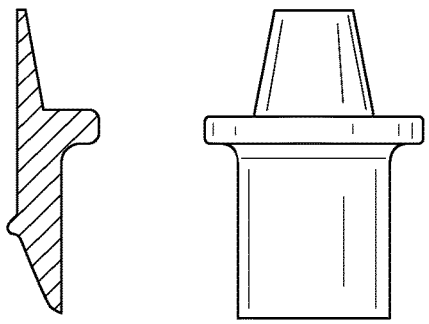
FIG. 3A shows a profile of the scan body and healing abutment according to an embodiment of the present invention.
Figure 3B:
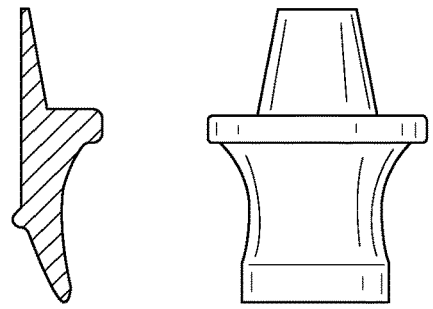
FIGS. 3B-3E show alternate profiles for the scan body and healing abutment.
Figure 3C:
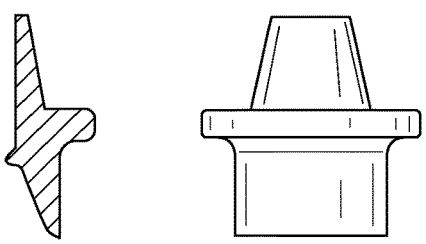
Figure 3D:
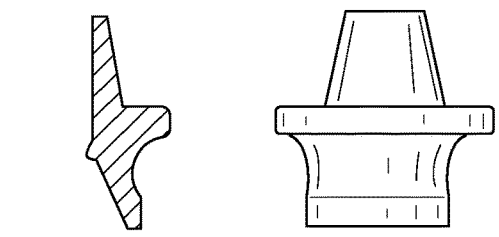
Figure 3E:
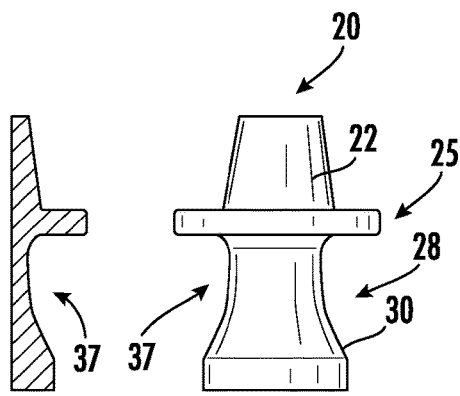

Differing cuff profiles can be seen in FIGS. 3A to 3E, with the profile of FIG. 3E being most preferred. This profile of FIG. 3E advantageously provides for the deepest indentation 37 inwardly under the lip of the skirt 25, which allows for building out of bigger gum tissue when the cap 20 is clamped down so that the skirt 25 holds the tissue down vertically, but the presence of the indentation to the extent of this particular profile allows the tissue to have room to grow in this indentation, even as its vertical growth is stopped by the skirt 25.

Figure 3F:
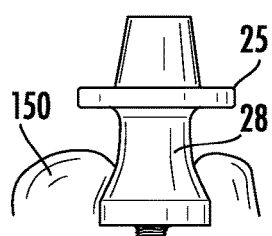
FIGS. 3F and 3G are sectional views showing the gum tissue in relation to the skirt and cuff of the scan body and healing abutment according to the present invention.
Figure 3G:
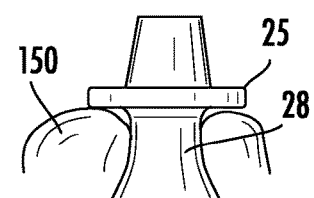

FIGS. 3F and 3G show how the gum tissue 150 grows upwardly around the cuff 28. The tissue modeling is guided by the cuff both in height and width and the preliminary healing occurs between 3-8 weeks. The tissue can grow upwardly toward, and eventually reaching an upper limit at FIG. 3G. As can be seen in these figures, the preferred profile allows for a considerable amount of tissue expansion and growth, and the healing abutment portion of the cap, consisting of the lower surface of the skirt 25 and the cuff 28, taken with the scan portion of the cap, consisting of the scan body 22 and the upper coded surface 27 of the skirt 25, allows the whole cap 20 to act as a scanning abutment that moves tissue out of the way, maintains Hemostasis and allows same day scanning. Healing of the implant in which the bone grows can vary from a period of 3 weeks to 18 months. The tissue can heal as fast as 3 weeks to as long as 1 year. The cap allows the position of the tissue to be predictably calculated within 6-8 weeks.

When plural ones of the device or cap 20 are installed, the skirt 25 sits on top of the gum tissue 150. Specifically, when this cap 20 is screwed into the multiunit, the cap 20 clamps and guides the soft tissue under it so that almost no blood will go above it. This is especially the case once all of the tissue across a portion of the upper or lower multiunit posts has been sealed with the cap 20.

The portion below the skirt 25 is a soft tissue area 150 which, due to the topography of the patient's patients palate, for example, will have multiple different heights (in this convention, from the palate, "heights" means extending downward toward the mandible). In the palate, after installation of the multiunit, a large amount of loose tissue will be present. But, as will be discussed below, with the use of the multiple instances of the cap 20 that functions as a healing abutment and a scan body (i.e., scannable portion), this loose tissue can be tucked out of the way to allow for a clear optical scanning of the scannable portions of the scan bodies, since this tissue, under the skirts 25, and with stitching around the caps is substantially not visible to the intraoral scanner.

The scan body (top part) will rest at multiple tissue heights. And because of the coding provided by the indicia on the skirt surface 27, the scan body portion of the cap will always protrude entirely out of the gum, so that the intraoral scanner will always see it, and the designer of the prosthesis will always have the full body of the scan body part outside of the gum line, and will have the information as to the heights of the cuff of each cap 20 that is scanned.

FIGS. 4A to 8F show the coding indicia, for example, dots, on the upper surface 27 of the skirt 25 at different vantage points and caps 20 of different cuff lengths.

Figure 4A:
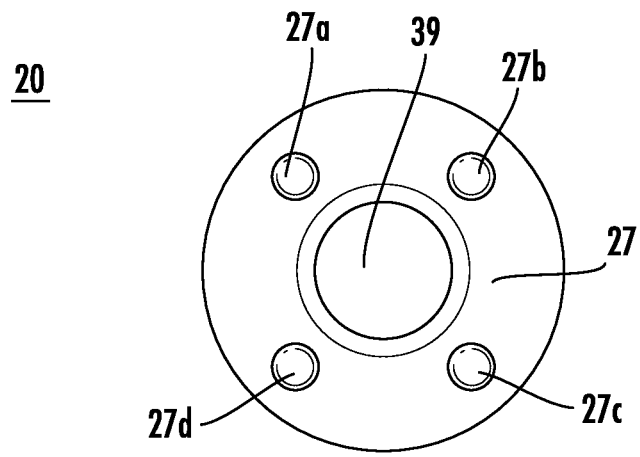

FIG. 4A shows a cap 20 that illustrates an exemplary coding of the scan body scannable portion formed by the upper surface 27 of the skirt 25. In this embodiment, the coding is formed by dots 27a to 27d in the case of four dots, as in FIG. 4A, positioned about a central opening 39. Preferably, the more dots formed on the surface 27 the longer the cuff. In the preferred embodiment, the four dots will represent a cap with the longest cuff, for example 4 mm, three dots will indicate a cuff length of 3 mm, two dots indicates 2 mm, and one dot 1 mm. It should be appreciated that any form of indicia instead of the illustrated dots, can be used to signify the length of the cuffs. This is advantageous in that the designer of the denture or tooth or bridge will instantly know the size of each cap because the optical scan will indicate the number of dots.

Figure 4B:
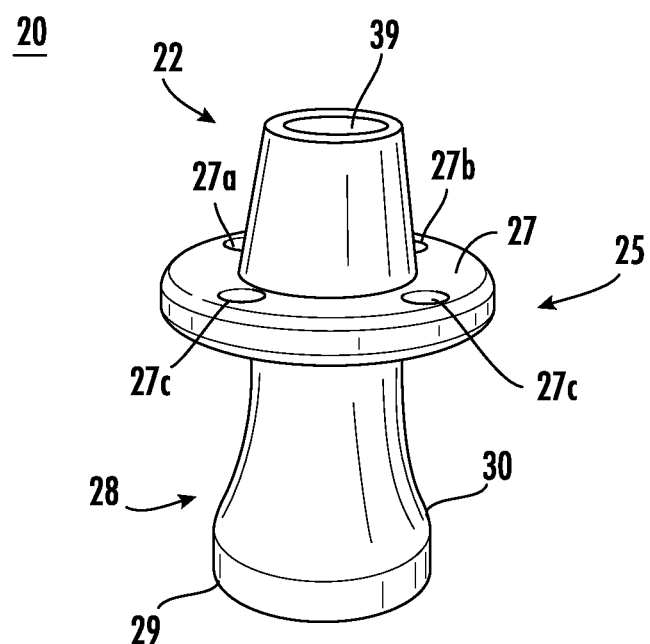
FIG. 4B is an elevation view of the scan body and healing abutment of FIG. 4A.
Figure 5A:
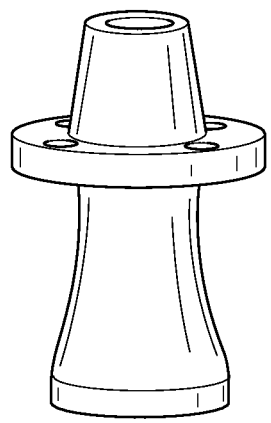
FIGS. 5A-5F are side views of a sequence of scan body and healing abutments having differing heights.
Figure 5B:
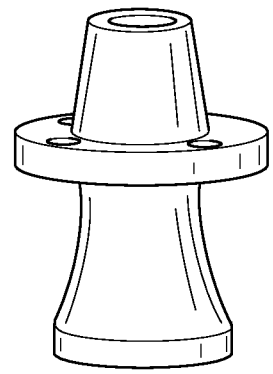
Figure 5C:
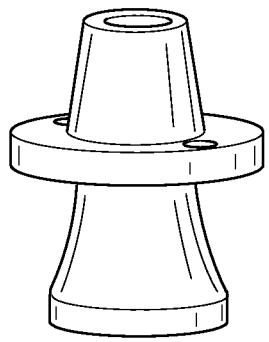
Figure 5D:
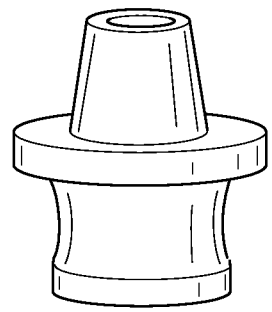
Figure 5E:
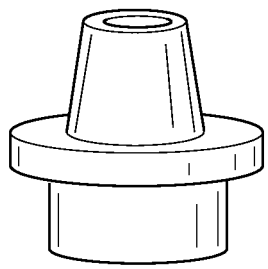
Figure 5F:
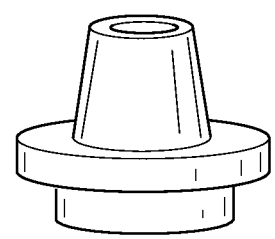
Figure 6A:
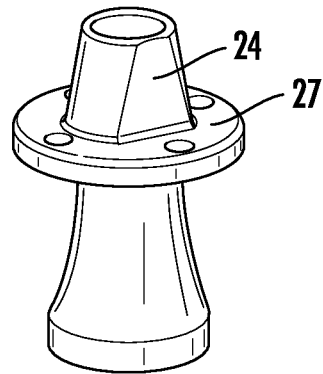
FIGS. 6A-6F are top perspective views of the scan body and healing abutments shown in FIGS. 5A-5F, in which the coding indicia indicating the varying heights are visible.
Figure 6B:
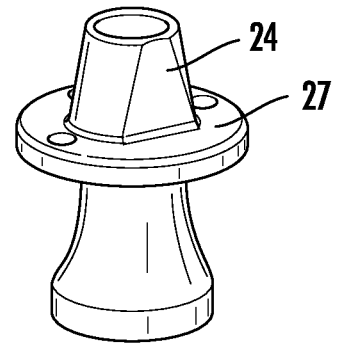
Figure 6C:
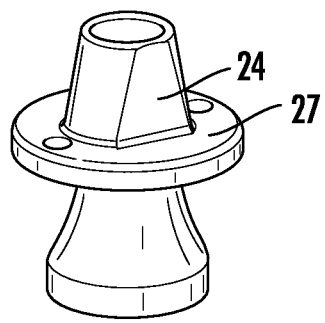
Figure 6D:
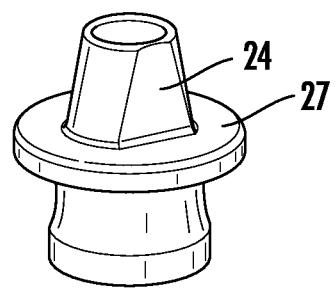
Figure 6E:
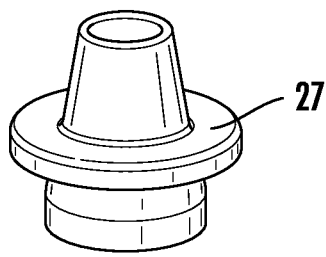
Figure 6F:
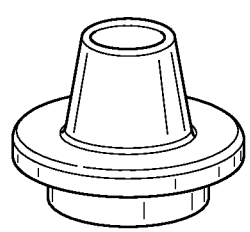
Figure 7A:
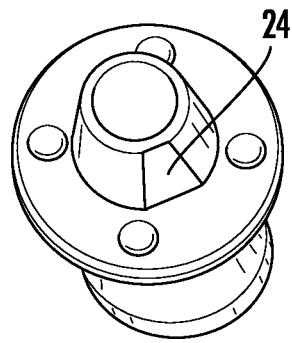
FIGS. 7A-7F are high perspective views of the scan body and healing abutments shown in FIGS. 5A-5F, in which the coding indicia indicating the varying heights are visible.
Figure 7B:
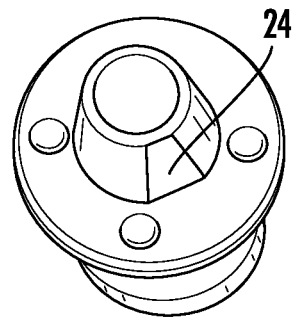
Figure 7C:
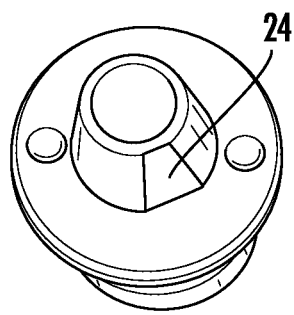
Figure 7D:
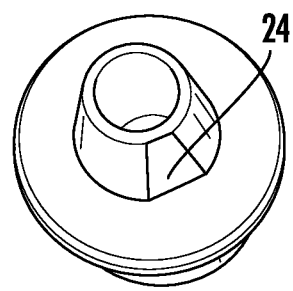
Figure 7E:
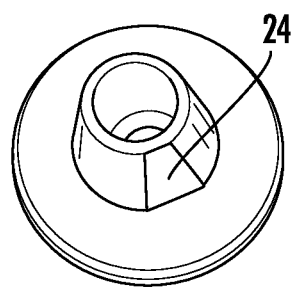
Figure 7F:
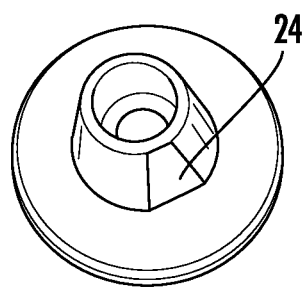
Figure 8A:
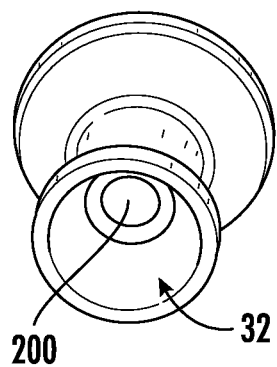
FIGS. 8A-8F are underside perspective views in which the hollow portions of the cuffs are visible.
Figure 8B:
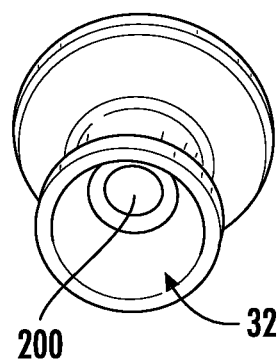
Figure 8C:
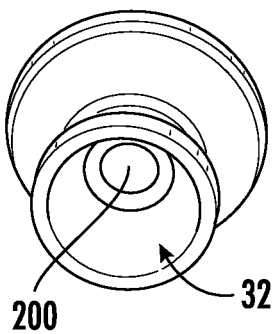
Figure 8D:
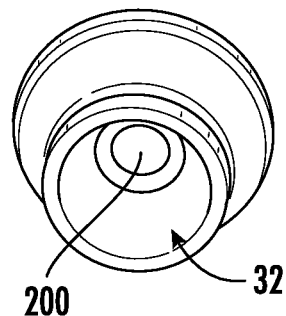
Figure 8E:
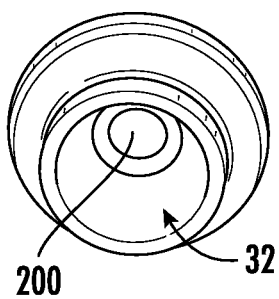
Figure 8F:
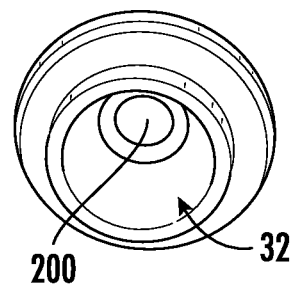

FIG. 4B is an isometric view of a 4 dot cuff length, i.e., the longest cuff length, cap 20, the components of which have been discussed in detail above.

FIGS. 5A-5F show a series of side by side caps 20, from the highest cuff version at the upper left of the figure to the lowest cuff version at the lower right. In this view, the top surface of the skirt is only slightly visible. FIGS. 6A-6F show the same caps 20 shown in FIGS. 5A-5F but angled such that it can be seen that the caps 20 having the longer cuffs have more of the dots. This is even more clear in FIGS. 7A-7F, which are top views of the caps 25 of the previous sets of figures. In this case 4, 3, and 2 dots are visible in the highest, second-highest and third-highest cuff versions, respectively.

Finally, FIGS. 8A-8F are bottom perspective views of the same set of caps shown in the immediately preceding drawings. In these views looking up into hollow cuff portion 32, a hole 200 can be seen. This hole allows a threaded screw to pass through the top of the cap to secure the cap to a protruding portion of a multiunit base or a single implant. The screws are shown in figures below.

Figure 9:
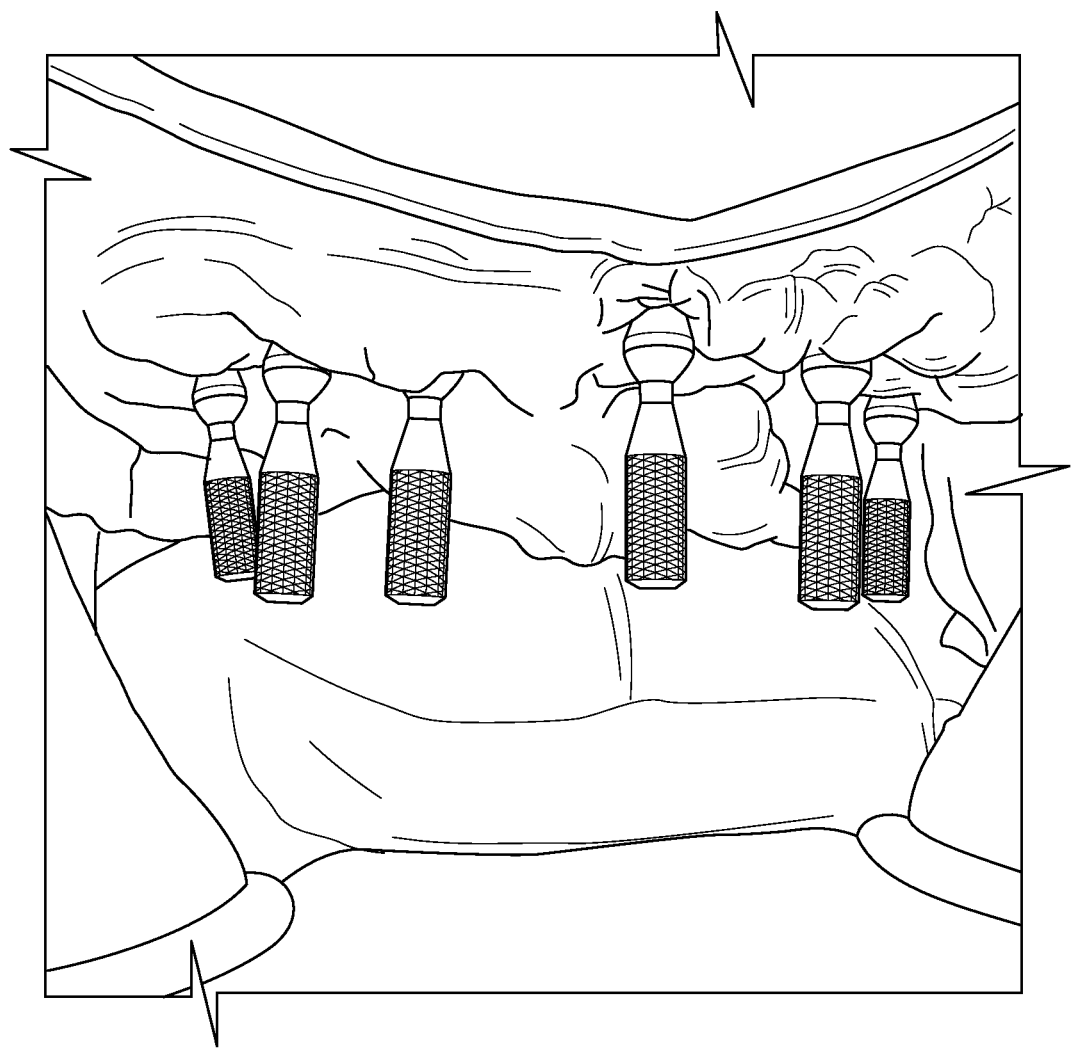
FIG. 9 shows the implant and multi-unit abutment with directional indicators with all the tissue retracted, prior to placement of the cap.

FIG. 9 shows the implant and multi-unit abutment with directional indicators with all the tissue retracted, prior to placement of the cap.

Figure 10:
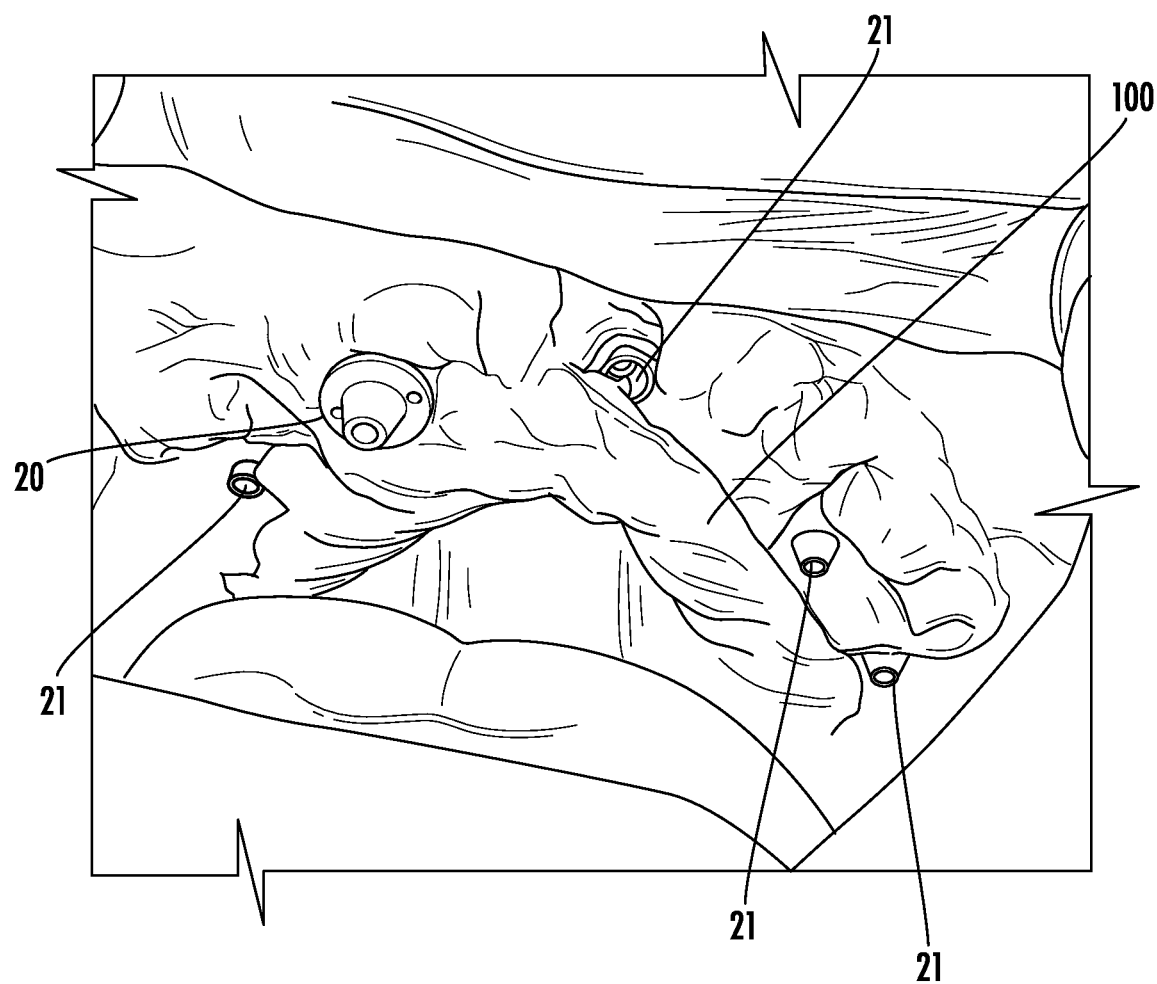
FIG. 10 is a view of a patient's mouth after implantation of the multiunit, with one such device according to the present invention having been installed into the multiunit.

FIG. 10 is a view of a cap 20 that has been installed into a protrusion 21 of a multiunit, other as yet uncapped portions 21 of the multiunit being visible at the right side of the figure. At this stage of installation, the single cap 25, with a signaling dot visible, has begun the process of sealing the palate 100 via the clamping down of the nearby palate tissue with the underside surface of the skirt 25. The remainder of the palate is still hanging loosely.

Figure 11:
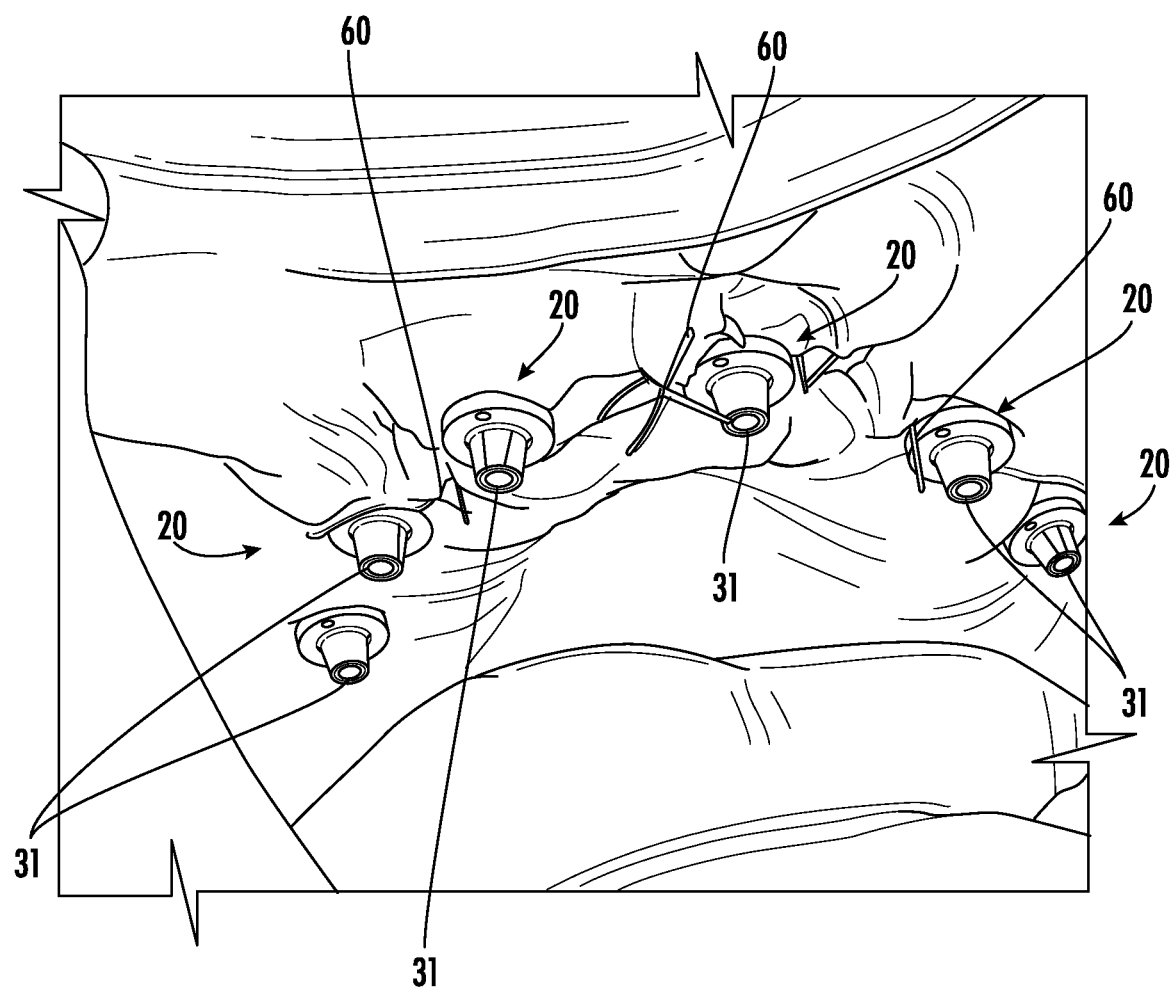
FIG. 11 is a view of the patient's mouth after a set of devices have been installed into the protrusions of the multiunit, and the gum tissue has been stitched around the devices.

FIG. 11 shows the point at which a complete set of caps 20 have been installed into corresponding portions of the multiunit, via the screws 31, and a stitch is done as well, to the right of the cap.

Between the stage shown in FIG. 10 and that shown in FIG. 11, after the single cap 20 is provided, as shown in FIG. 10, the tissue, in this case palate and/or gum tissue, in each area is clamped down by the skirts 25 of further caps 20, which, with appropriate stitching 60 provided around the caps 20, stops the bleeding and allows the procedure to continue, one after another until all are installed as shown in FIG. 11. By virtue of this process, the multiunit can be chosen not based on the ability to have the healing abutment stick out so as to visible, but on the ability to create an emergence profile and how much tissue there actually is.

Also, by the above method and cap 20, no more will all of the healthy palatal tissue be cut away. Instead it is preserved by clamping everything down under the cap 20, in combination with the appropriate stitching.

Figure 12:
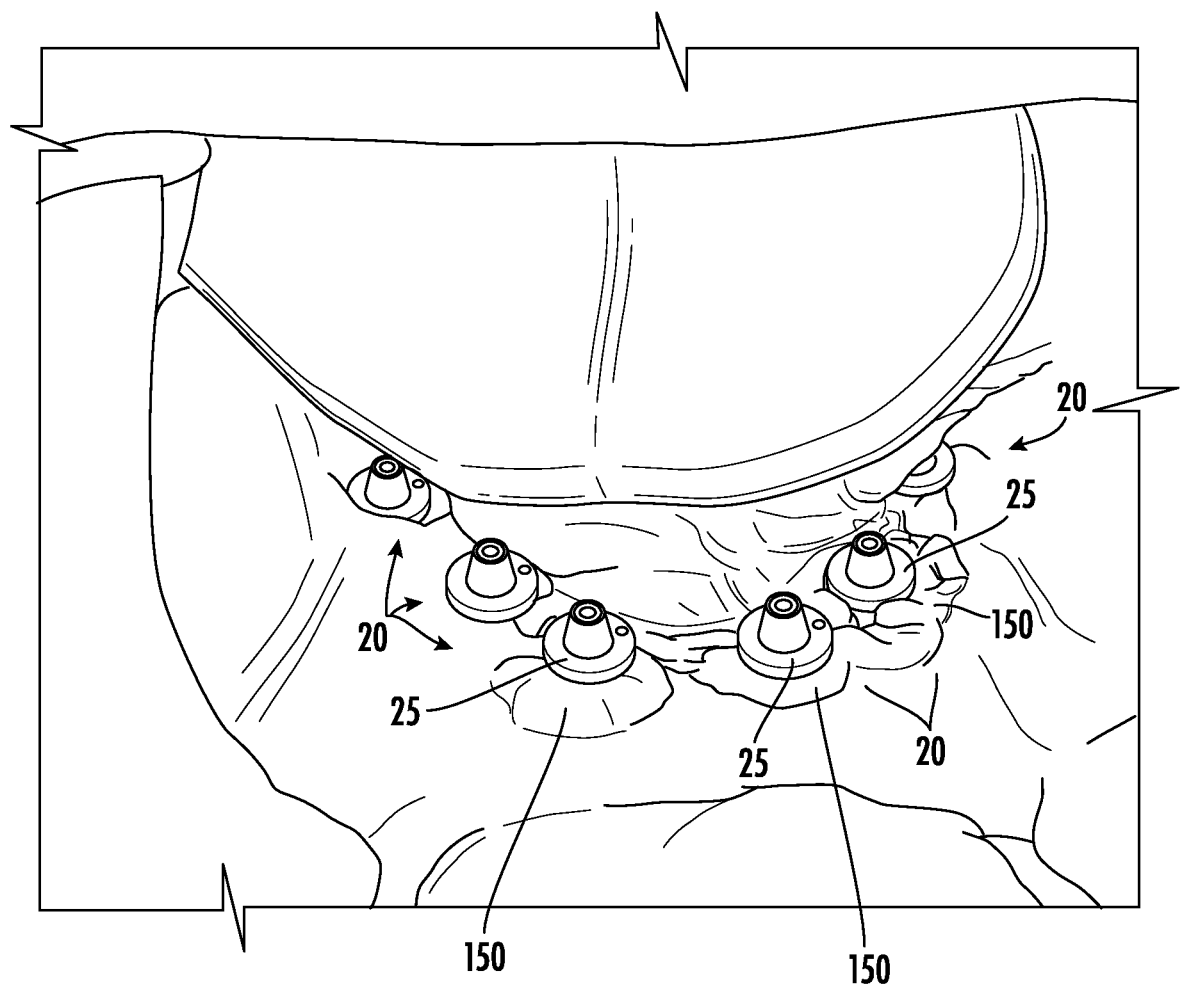
FIG. 12 is a view of the patient's mouth in which a set of devices has been installed into a multiunit in the mandible.

FIG. 12 shows the end result of same procedure as outline above, but performed in a lower jaw. That is, in the mandible it can be seen in this figure how the skirt 25 holds the tissue down, and a thicker band of tissue 150 is provided around the implants. As can be seen in this figure, each skirt has a different arrangement and number of dots.

Figure 13:
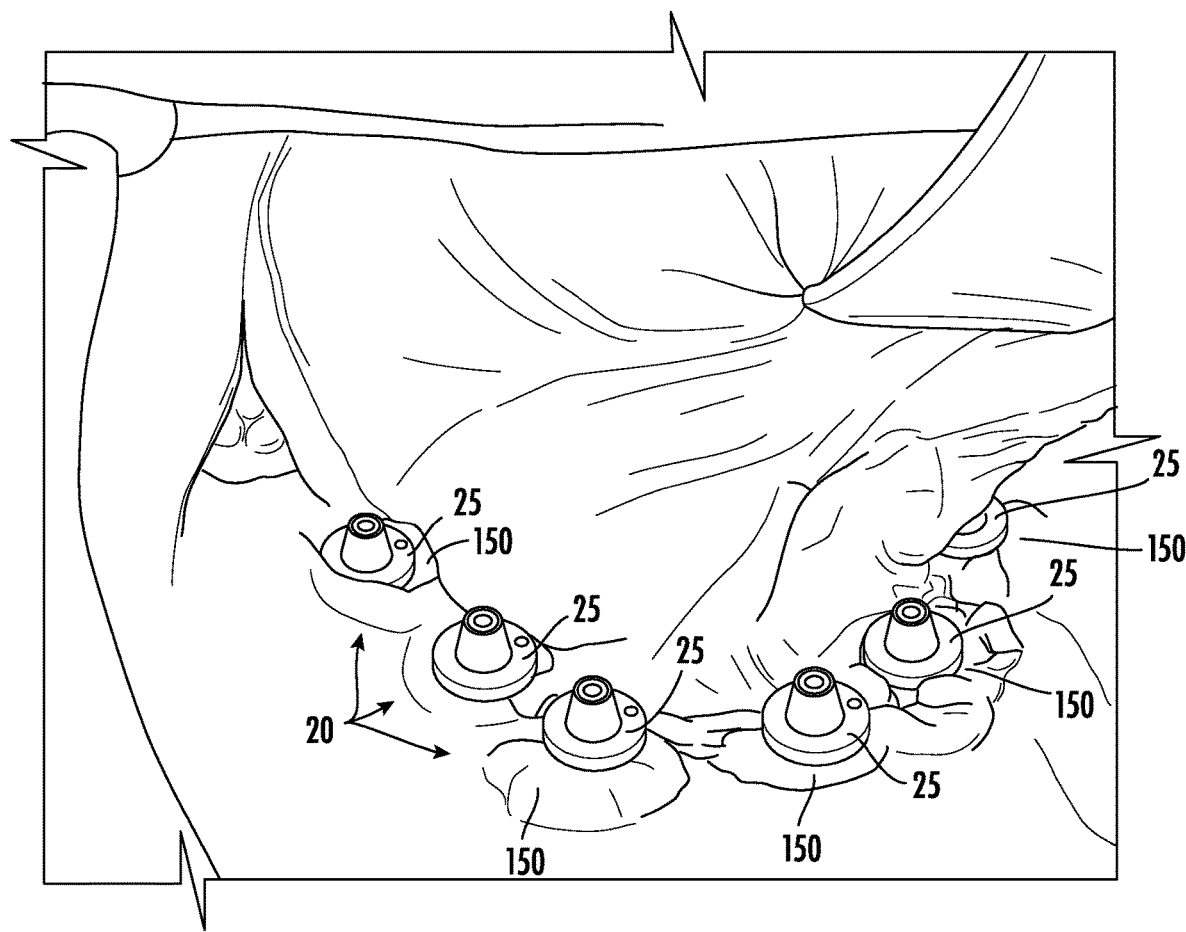
FIG. 13 is another view of the patient's mouth in which the set of devices has been installed into a multiunit in the mandible.

As can be seen in FIG. 13, for example, the scan bodies are always protruding and easy to scan, and the tissue 150 is held down and spread appropriately, making it easy for the designer to align the scan bodies.

Figure 14:
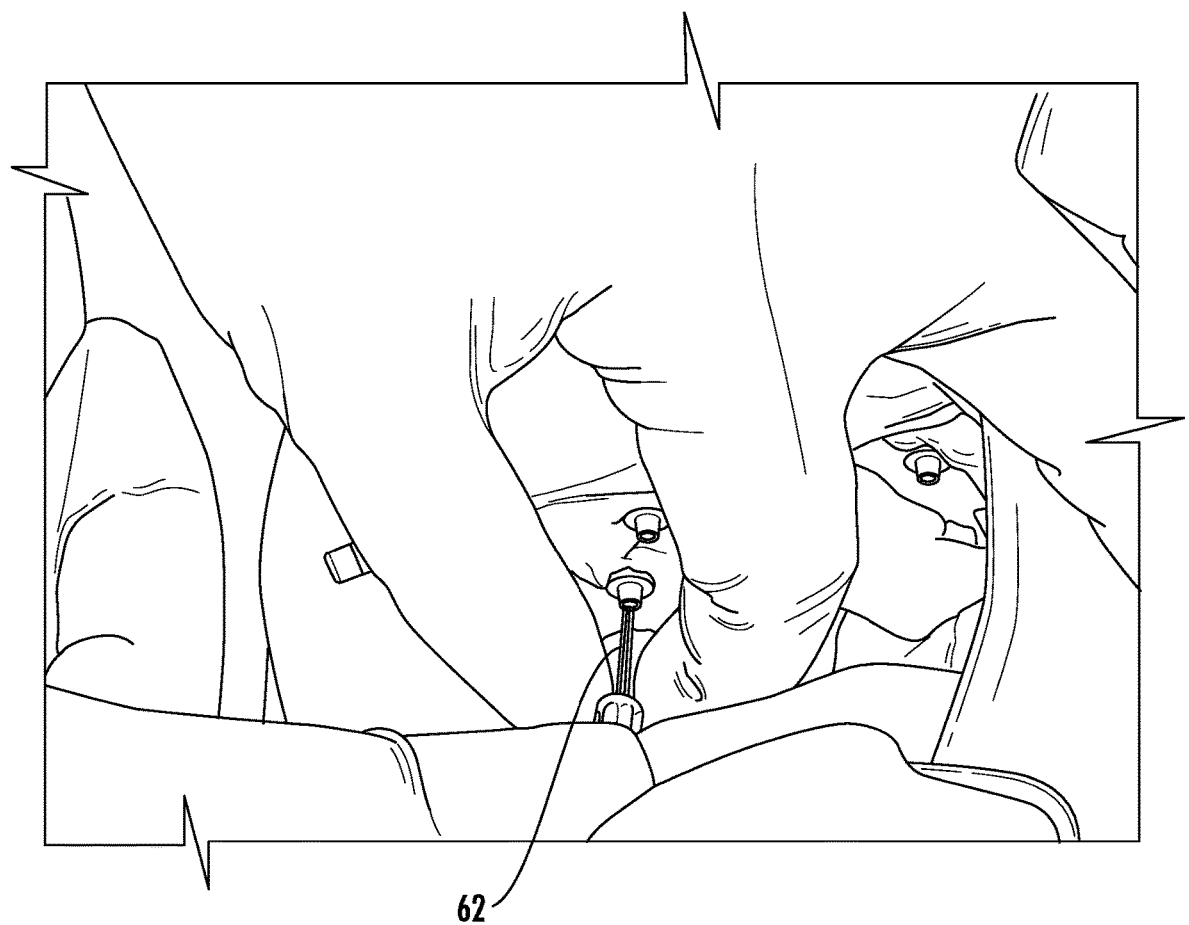
FIG. 14 shows a scan body and healing abutment being installed into the multiunit using a screwdriver.

FIG. 14 shows cap being screwed into an implant of a multiunit with a driver 60. With regard to the clamping and the stitching, it is preferable to suture a restoration flap and then place the cap on top so the tissue is approximated to where you want it to be and it will clamp the tissue right back down. you can see the male protrusions of the multiunit over which the bottom of the cap sits at the lower right in the next slide.

Figure 15:
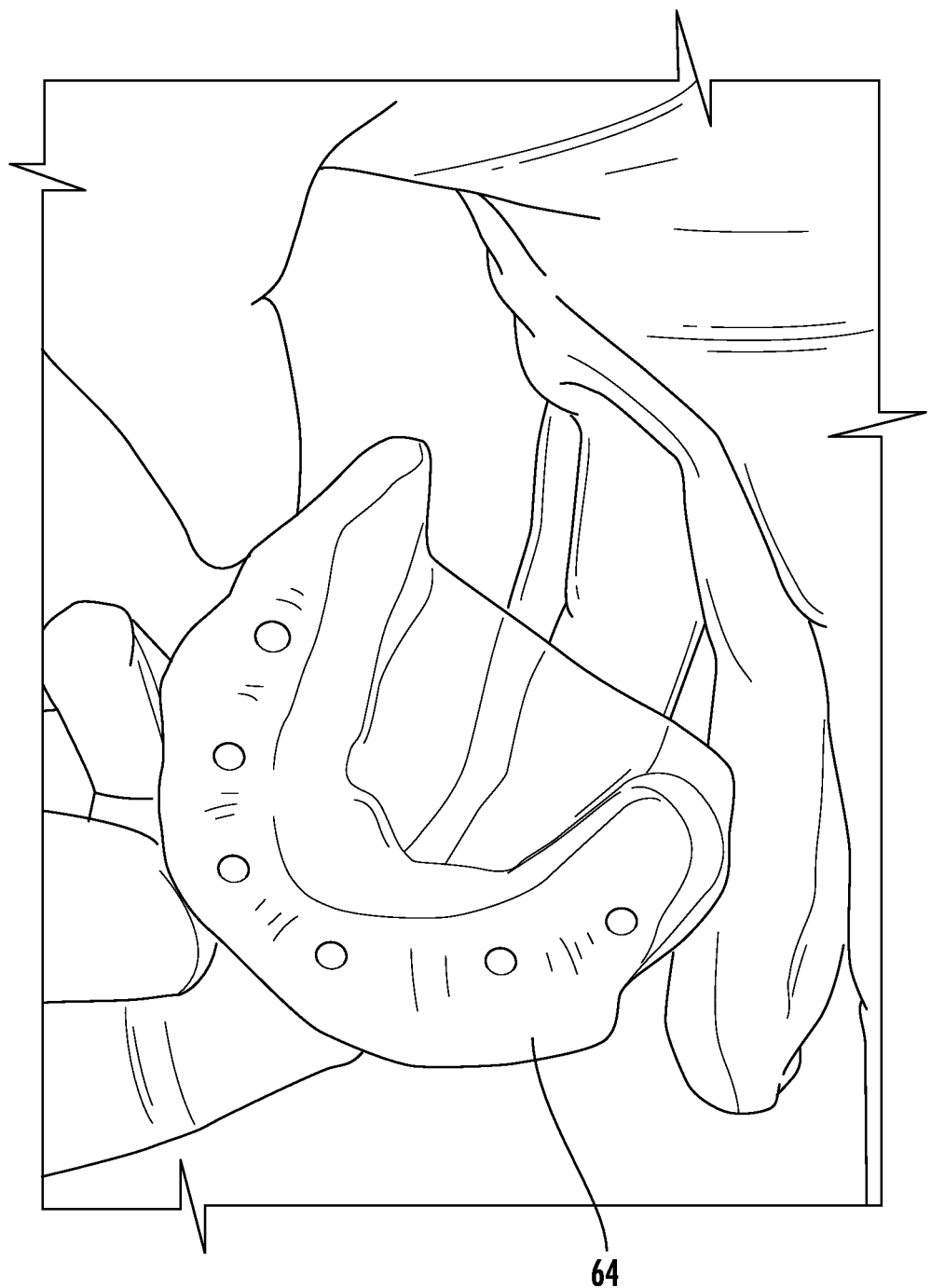
FIG. 15 is an impression made after the implantation of the scan body and healing abutment into the multiunit.
Figure 16:
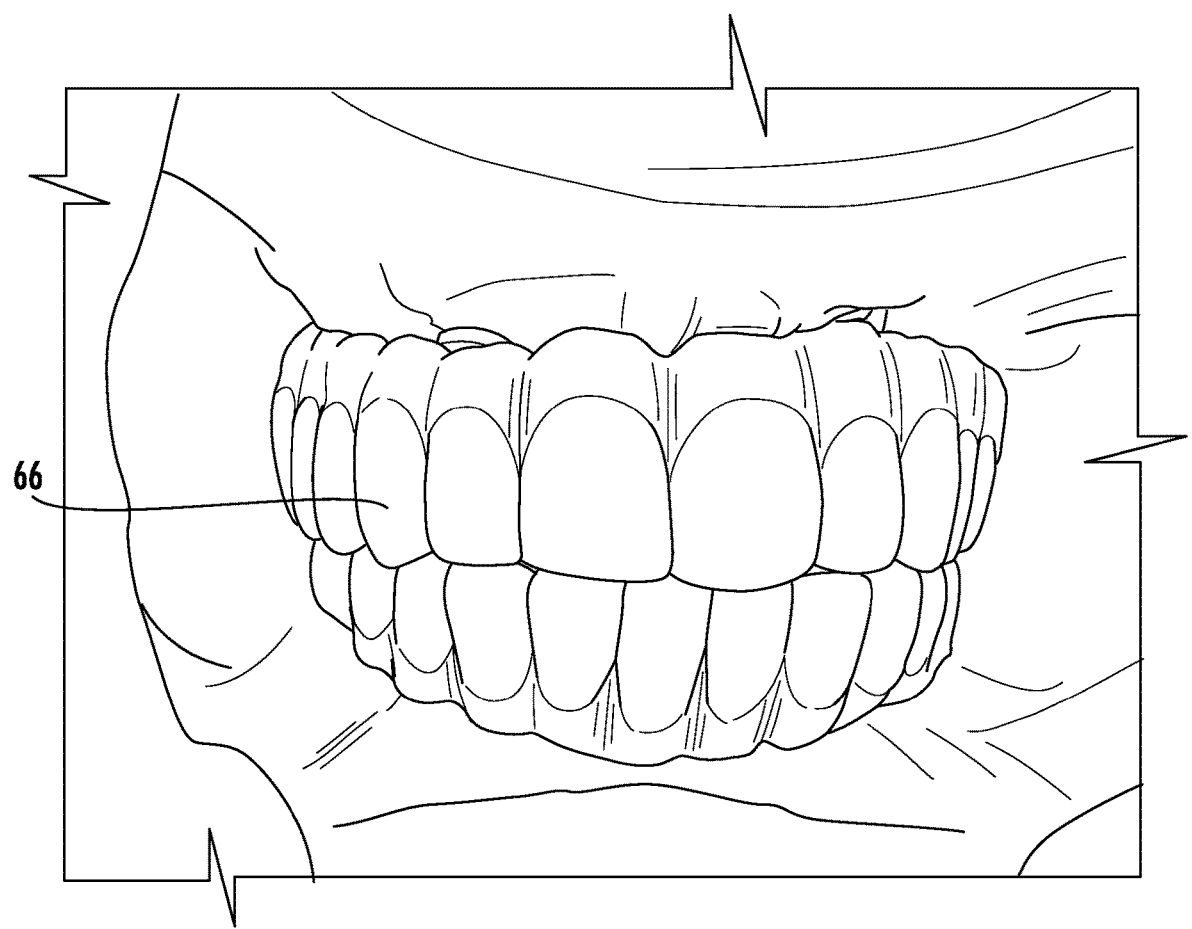
FIG. 16 shows a temporary set of dentures attached to the scan body and healing abutment of the present invention.

FIG. 15 shows a shaped impression 64, namely the space made by the cap in the temporary teeth that will be filled with cement and placed in the mouth on the cap. The FIG. 16 shows a temporary denture 66 that is attached to the caps 20 in the time in which the permanent one is being prepared based on the intra oral scan.

Figure 17:
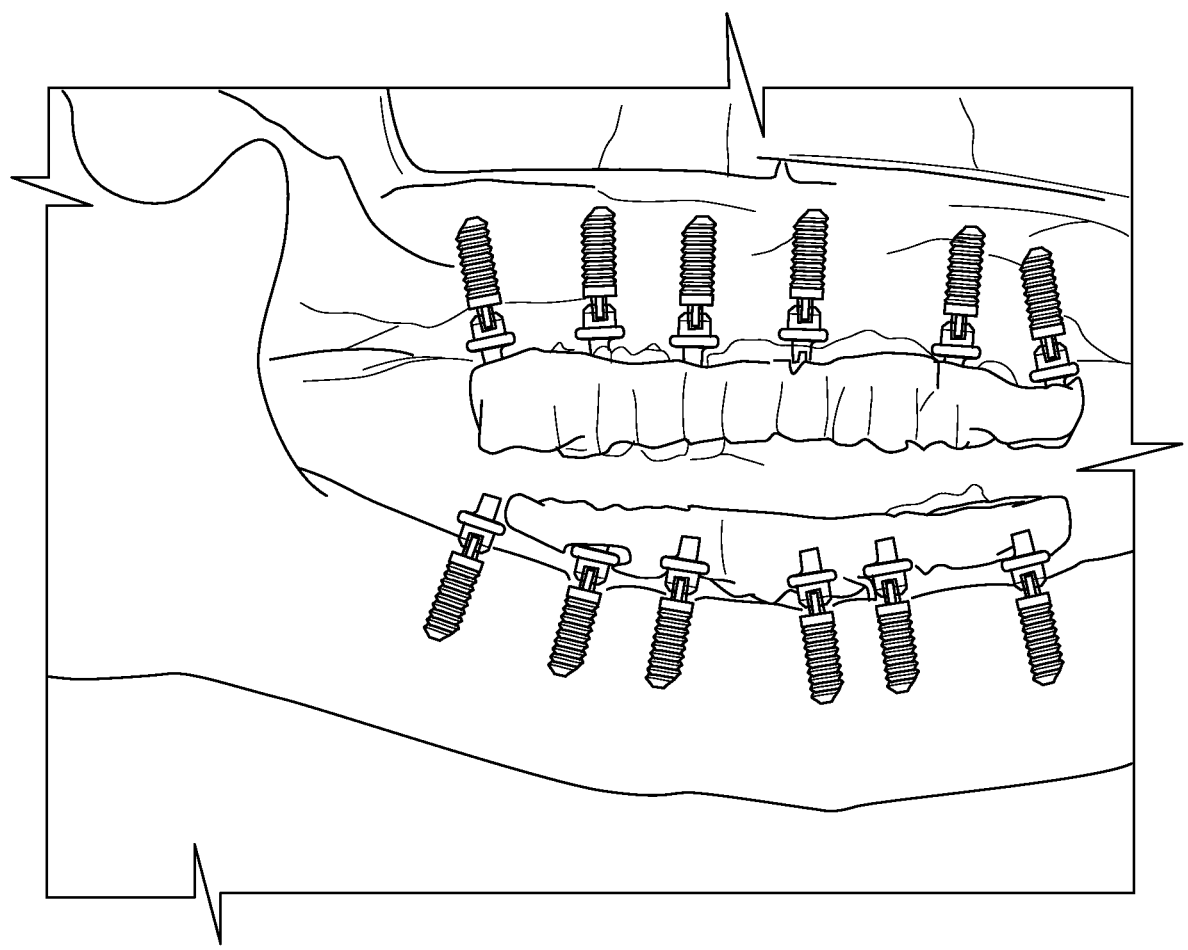
FIG. 17 is an x-ray view of the devices with the temporary attached.

FIG. 17 is an x-ray view that illustrates the retention of the temporary denture with the caps 20.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A cap for coupling to an implanted dental component, the cap comprising:
   a scannable portion comprising a tapered body, the tapered body including a hole configured to receive a screw for attaching the cap to the implanted dental component;
   a healing abutment portion comprising a tapered hollow cuff having a height along a longitudinal axis; and
   a skirt positioned between the scannable portion and the healing abutment portion, the skirt having an upper surface containing scannable indicia, the scannable indicia indicative of a height of the tapered hollow cuff;
   wherein the scannable portion is positioned at a top end of the healing abutment portion; and
   wherein the tapered hollow cuff has an arcuate curvature extending from a first diameter portion indented under a lower surface of the skirt toward a second diameter portion at a distal end of the cap; the second diameter being larger than the first diameter and larger than a diameter of the implanted dental component, the tapered hollow cuff dimensioned to fit over and receive a protrusion of the implanted dental component.

2. The cap of claim 1, wherein the scannable portion includes an index portion with a flat surface.

3. The cap of claim 1, wherein the scannable indicia comprises one or more dots indicative of a length of the healing abutment portion.

4. The cap of claim 3, wherein the skirt further comprises the upper surface and the upper surface of the skirt is planar and lies perpendicular to the longitudinal axis of the healing abutment portion.

5. The cap of claim 1, further comprising an internal hollow extending over a portion of a length of the healing abutment portion.

6. A method of creating a dental restoration using the cap of claim 1, said method comprising:
   scanning the scannable portion and healing abutment portion with an intra-oral scanner or taking an impression of the scannable portion;
   using information from the scanning or taking the impression to design a dental restoration; and
   producing the dental restoration so designed.

7. The cap of claim 1, wherein:
   the healing abutment portion is configured to be attached to a dental implant or multiunit protrusion, the healing abutment portion being configured to selectively support a final restoration and having a surface that corresponds to a height of soft tissue adjacent the installed dental implant; and
   the scannable portion has at least one feature configured to be scanned by an intra-oral scanner or transferred to a physical impression to transfer information regarding an orientation and position of the healing abutment and the dental implant or multiunit protrusion.

8. The cap of claim 1, wherein the skirt has a beveled lateral edge.

9. A cap for coupling to an implanted dental component, the cap comprising:
   a scannable portion comprising a tapered body, the tapered body including a hole configured to receive a screw for attaching the cap to the implanted dental component;
   a healing abutment portion; and
   a skirt positioned between the scannable portion and the healing abutment portion, the skirt having an upper surface containing scannable indicia, the scannable indicia indicative of a height of the healing abutment portion, and a lower surface,
   wherein the scannable portion is positioned at a top end of the healing abutment portion,
   wherein the healing abutment portion comprises the lower surface of the skirt and a hollow cuff extending from the lower surface of the skirt toward a distal end the hollow cuff having a smaller diameter than the lower surface of the skirt, and
   wherein the hollow cuff is dimensioned to fit over and receive a protrusion of the implanted dental component and the skirt is configured to prevent extension of gum tissue above the lower surface of the skirt.

* * * * *